United States Patent
McGeorge

(10) Patent No.: US 7,941,357 B2
(45) Date of Patent: May 10, 2011

(54) TRADING SYSTEM

(75) Inventor: Jeffrey Bruce McGeorge, Queensland (AU)

(73) Assignee: Markets-Alert Pty Ltd, New South Wales (AU)

( * ) Notice: Subject to any disclaimer, the term of this patent is extended or adjusted under 35 U.S.C. 154(b) by 1251 days.

(21) Appl. No.: 10/415,022

(22) PCT Filed: Oct. 26, 2001

(86) PCT No.: PCT/AU01/01380
§ 371 (c)(1),
(2), (4) Date: Sep. 5, 2003

(87) PCT Pub. No.: WO02/35400
PCT Pub. Date: May 2, 2002

(65) Prior Publication Data
US 2004/0039683 A1     Feb. 26, 2004

(51) Int. Cl.
*G06Q 40/00* (2006.01)
(52) U.S. Cl. ............... 705/36 R; 705/36; 705/37
(58) Field of Classification Search ............ 705/37, 705/1.1, 35, 36, 36 R
See application file for complete search history.

(56) References Cited

U.S. PATENT DOCUMENTS

| | | | |
|---|---|---|---|
| 5,946,666 A * | 8/1999 | Nevo et al. | 705/36 R |
| 6,260,148 B1 | 7/2001 | Aggarwal et al. | |
| 6,317,728 B1 * | 11/2001 | Kane | 705/36 R |
| 6,681,211 B1 * | 1/2004 | Gatto | 705/36 R |
| 6,907,404 B1 * | 6/2005 | Li | 705/36 R |
| 6,968,317 B1 * | 11/2005 | Wallace et al. | 705/36 R |
| 7,181,417 B1 * | 2/2007 | Langseth et al. | 705/26 |
| 7,333,951 B1 * | 2/2008 | Corning et al. | 705/36 R |
| 7,356,499 B1 * | 4/2008 | Amburn | 705/37 |
| 7,461,023 B1 * | 12/2008 | Helweg | 705/37 |
| 2002/0055899 A1 * | 5/2002 | Williams | 705/37 |
| 2003/0097327 A1 * | 5/2003 | Anaya et al. | 705/37 |

FOREIGN PATENT DOCUMENTS

| | | | |
|---|---|---|---|
| JP | 09-305656 | | 11/1987 |
| JP | 07-296057 | | 11/1995 |
| JP | 11136365 | | 5/1999 |
| JP | 11-224289 | | 8/1999 |
| JP | 11-224295 | | 8/1999 |
| JP | 2000-092537 | | 3/2000 |
| JP | 2000092537 | | 3/2000 |
| WO | WO 9526005 | * | 9/1995 |
| WO | 99/48250 | | 9/1999 |
| WO | 00/01172 | | 1/2000 |
| WO | 00/07385 | | 2/2000 |

(Continued)

OTHER PUBLICATIONS

Tanigawa, T., Kamijo, K.; "Stock price pattern matching system-dynamic programming neural networks approach"; NEC Corp.; IEEE Int. Neural Network Soc.; 1992; p. 1.*

(Continued)

*Primary Examiner* — Ella Colbert
(74) *Attorney, Agent, or Firm* — Renner, Otto, Boisselle & Sklar, LLP

(57) ABSTRACT

A trading system whereby a user device to input stock market technical analysis makes requests from a computer terminal, wireless device or other electronic medium with intent to receive stock market technical analysis alerts from a server through wireless or land-line communication means.

4 Claims, 3 Drawing Sheets

FOREIGN PATENT DOCUMENTS

| WO | 00/11587 | 3/2000 |
| WO | 00/78067 | 12/2000 |
| WO | 01/42884 | 6/2001 |
| WO | 01/54016 | 7/2001 |
| WO | 01/61589 | 8/2001 |
| WO | 01/65339 | 9/2001 |

OTHER PUBLICATIONS

Schmerken, I.; "Technical charting lights up securities trading"; Wall Street Computer Review, vol. 6, No. 9; Jun. 1989; p. 1.*

Byramji, H. M.; "New Product offers real-tim technical analysis charting"; Wall Street Computer Review; vol. 4, No. 6; Mar. 1987; p. 1.*

Nathaniel C. Nash; "Strategies for the Sophisticated"; New York Times, Late City Final Edition ED, col. 1; Sunday Nov. 20, 1983; pp. 1-4.*

George Johnson; "Sifting Hidden Market Patterns for Profit"; New York Times, Late Edition-Final ED, col. 2; Monday, Sep. 11, 1995; pp. 1-3.*

Jingtao Yao, Chew Lim Tan and Hean-Lee Poh; "Neural Networks for Technical Analysis: A Study On KLCI"; International Journal of Theoretical and Applied Finance, vol. 2, No. 2; 1999; pp. 221-241.*

PRNewswire; QAS Releases PaperTrader 1.0, Portfolio Calculator Software for TeleChart 2000 USers; Feb. 15, 2000; pp. 1 and 2.*

* cited by examiner

TRADING SYSTEM

RELATED APPLICATION DATA

This application is a national phase of International Application No. PCTAU01/01380 filed Oct. 26, 2001 and published in the English language.

TECHNICAL FIELD

The present invention relates to a trading system which combines stock market technical analysis and indicators, as well as the field of information technology in mobile communications.

BACKGROUND ART

There are many individuals and organizations with an interest in the stock market for whom up-to-the minute stock market information is of vital importance.

It is also important that they are able to contact their dealers or brokers to provide instructions for share market transactions on an instantaneous basis.

Most individuals in particular who may have other occupational or hobby interests which take them away from or out of communication with stock market events can be severely disadvantaged if an event such as a sudden downward adjustment to share values takes place without their knowledge.

Stock market technical analysis is becoming increasingly sophisticated and measures of events based on technical analysis indicators e.g. "moving averages," "RSI" "stochastic osillator" and the like are extensively used to analyze sharemarket price and time data and for share portfolio management.

The forms of analysis involves the measurement of share prices against small blocks of time.

The analysis can be communicated to stock holders numerically and/or graphically via computers or television monitors.

Most investors have access to personal communication systems such as cellular telephones and other digital apparatus operated by wireless technologies.

SUMMARY OF THE INVENTION

The present invention provides for the transmission of stock market technical analysis indicators, and corresponding alerts in relation to the data created by technical analysis where the transmission of all data is handled through wireless technology, currently expressed as WAP (wireless application protocol) and SMS (short message service) to send and receive various types of stock market information using wireless technology and digital television transmission.

Further features and advantages of the present invention will now become apparent from the ensuing description which is given by way of example only.

According to the present invention there is provided a method of share trading comprising the steps of:

(a) a provider receiving stock market data on a network of computers, (b) a user instructing a provider to forward to it stock market technical analysis criteria via a second system, and (c) the provider providing a message to the user of requested stock market events via the second system.

A user can instruct the provider to provide technical analysis criteria for specific stocks.

A user can instruct the provider to provide technical analysis criteria of overall stock market trends.

The second system can comprise a users fixed or mobile telephone, a personal computing device, a facsimile or pager of the user.

The network of computers can include components that receive user input commands for a software environment component residing on the network of computers controlled by the users second system.

The users second system can be capable of wireless or land line communications.

The users second system software component can send input commands to a software environment that is running on the network of computer systems.

In response to the input command the software environment sends a local input command to a software environment component that processes the commands which responds by issuing a local output command to a server infrastructure which in turn sends a remote output command to the users second system.

In response to remote output commands the second system can cause an output from the system consisting of stock market technical analysis information and stock market alerts.

A plurality of integrated and related systems can be provided to achieve information transfer.

The systems and relationships can be as follows:

(i) From an Internet software, Wap enabled phone or mobile input device, the user sends a message or command from a second system device, which is then intercepted by the switching box. The message may contain data: including information about how to setup the users watches, requests for specific data or login information.

(ii) A server switch box can receive all messages sent from any computer or device connected or connecting to the system. The function of the switch box can be to:
  (1) find the least busy drone computer within a network to process a specific command or watch.
  (2) route alerts to an sms server to be sent to clients computers or mobile handsets.
  (3) Send requested information between drone computers.

(iii) Drone computer systems as part of the network are each connected via a local area network using the tcp/ip protocol (internet protocol). The drones are directly connected to the exchange data server. The drone has two main purposes they are as follows:
  (1) To accept, process and return static stock market data which a user has requested from the service.
  (2) To repetitively calculate users requested "watch data" (an event set by the user to trigger an alert which is sent to the users mobile or static device). The watch data can consist of: a simple, price/volume or price plus volume watch or a technical analysis request, e.g. trend line drawing, moving average alerts, as well as other well documented technical analysis systems.

(iv) Sms server software receives a message from a drone routed through the switch. Once the sms server software receives the message, the sms server finds the corresponding users data (i.e. phone number, name) and passes the message as well as the correct phone number to send the message, to the sms communications device.

(v) An sms communications device receives a message from the sms server and broadcasts it to the mobile communications device.

In an alternative embodiment of the present invention one or more "history servers" can be added, the purpose of which is to provide data to any of the computers connected to the network.

The history server is in place so that it can act as a gateway to the exchange data feed.

The history server scoops all of the data out of the data feed as it comes along, so that the data never needs to be requested from an outside source more than once.

All servers connected to the network request their data from the history server.

The drones are no longer directly connected to the exchange data feed, they are in fact connected to the switchbox and request their data from the new history server.

A central data storage has been created to house the databases created by the history server.

Each history server connected to the system uses these databases (located on another computer) so that cohesion remains throughout the network.

BRIEF DESCRIPTION OF THE DRAWINGS

Aspects of the present invention will now be described with reference to the accompanying schematic drawings in which.

DETAILED DESCRIPTION

Figure 1:
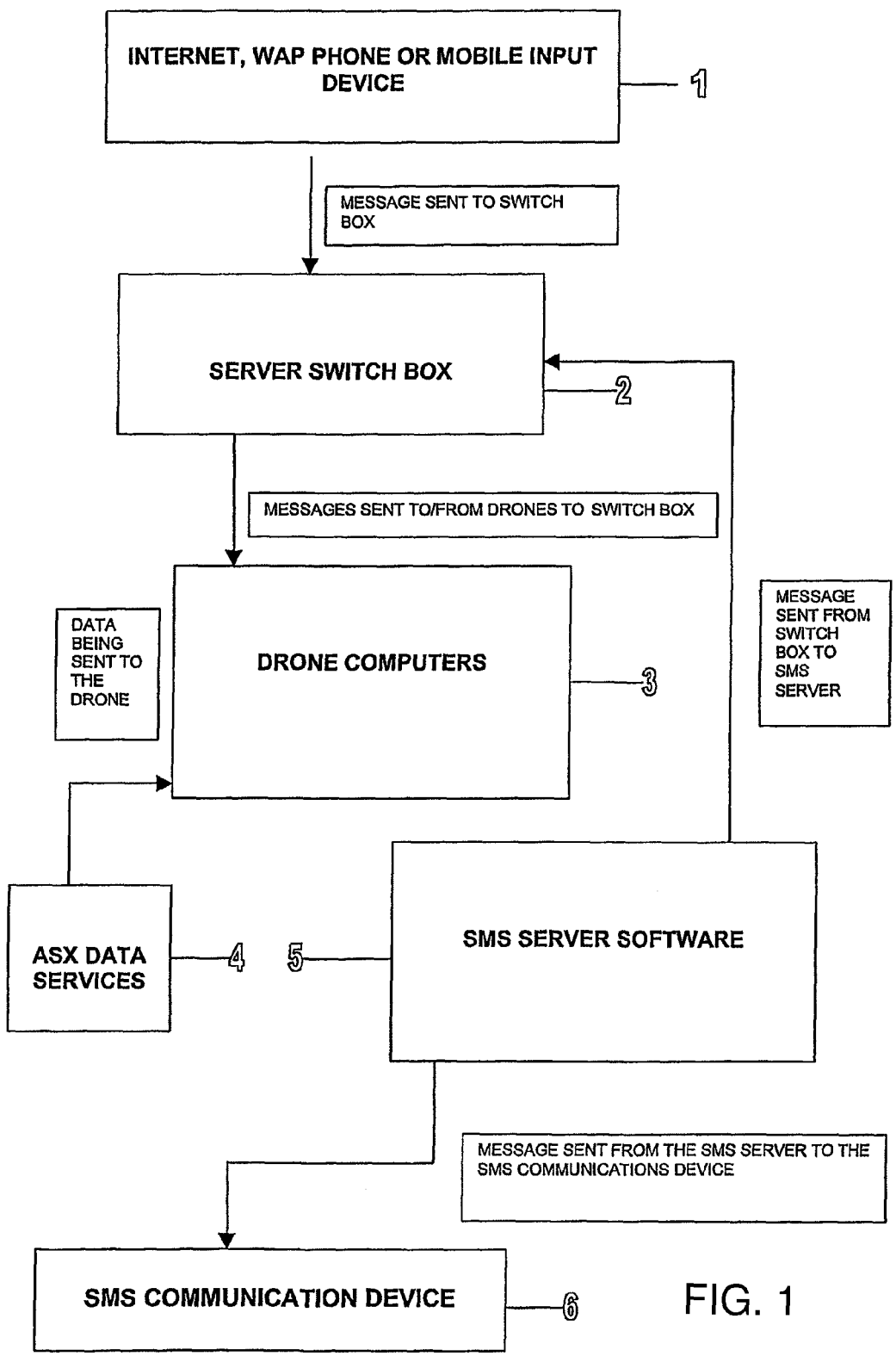
FIG. 1 illustrates how elements of a computer system can be related according to one aspect of the present invention.

With respect to FIG. 1 of the drawings, element 1 sends a message to the switch box about what kind of data to view or what kind of indicators to add.

Element 2 the server switch box receives a message from the internet, A WAP enabled phone or mobile input device. It then finds the least busy drone computer and sends that message to that computer to be processed.

The switch also processes logins and logoffs of the SMS server, drone computers and remote.

Element 3 a series of computers connected via a network (LAN) which is also connected to the exchange data server and switch systems.

The drone processes messages from the users (sent via the switch). These messages are technical indicator instructions. The drone then analysis the stock market at a specified internal and applies the users chosen technical and analysis indicators formulas to the data. If the data is a valid technical response (e.g. price has reached) the drone sends a message to the switch which then sends it to the SMS server.

Element 4 data is fed from the exchange to the drone computers. (when requested to do so by the drone).

Element 5 receives a message from a drone computer, which is routed through the switch box.

The message tells the SMS server to find out what phone to send a message to.

The SMS server then contacts the SMS communications device and tells it to send the appropriate alert.

Element 6 receives message from the SMS server and broadcasts it to the mobile phone number sent to it from the SMS server.

Figure 2:
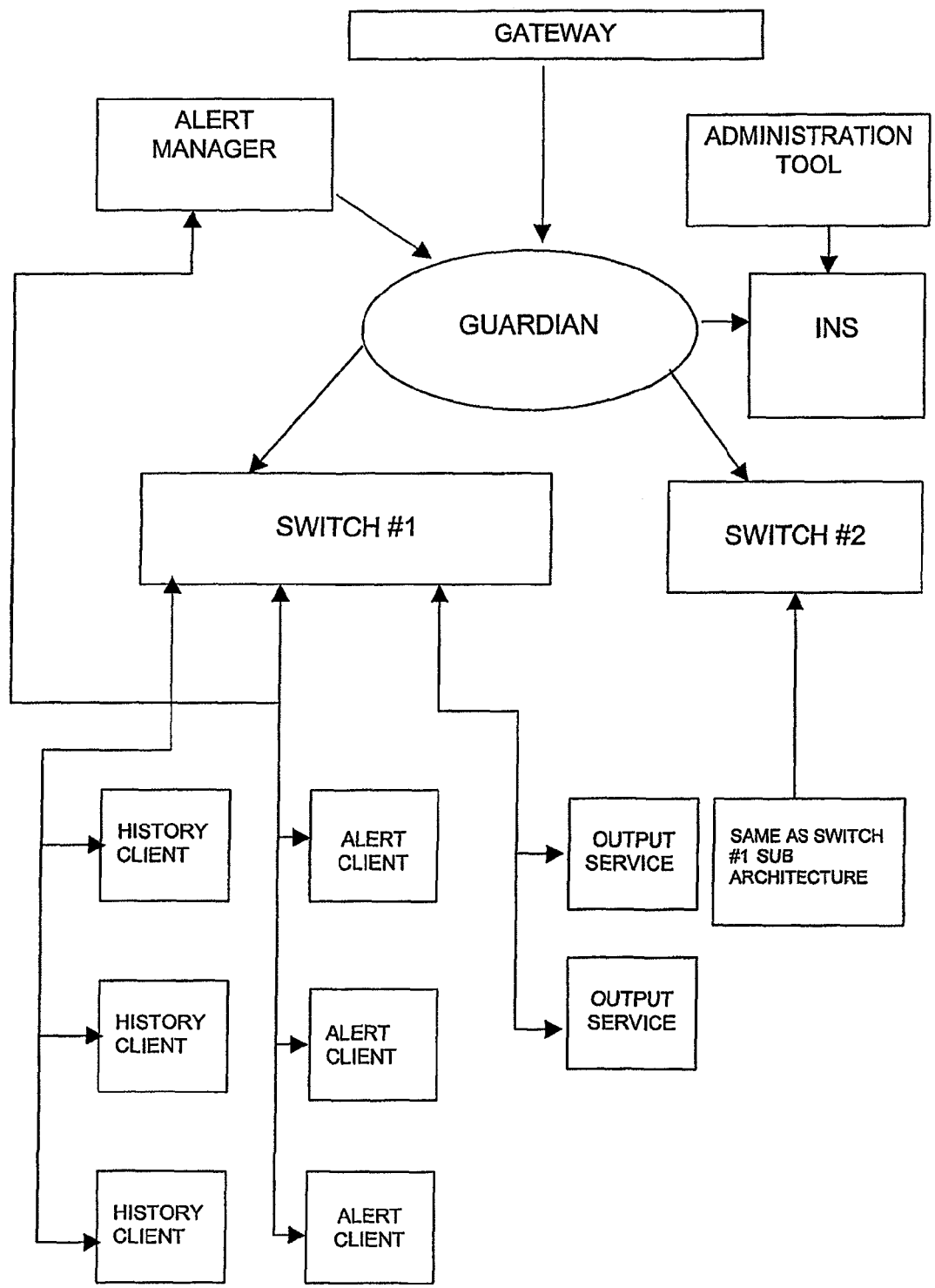
FIG. 2 illustrates an alternative extended computer system to that of FIG. 1.
Figure 3:
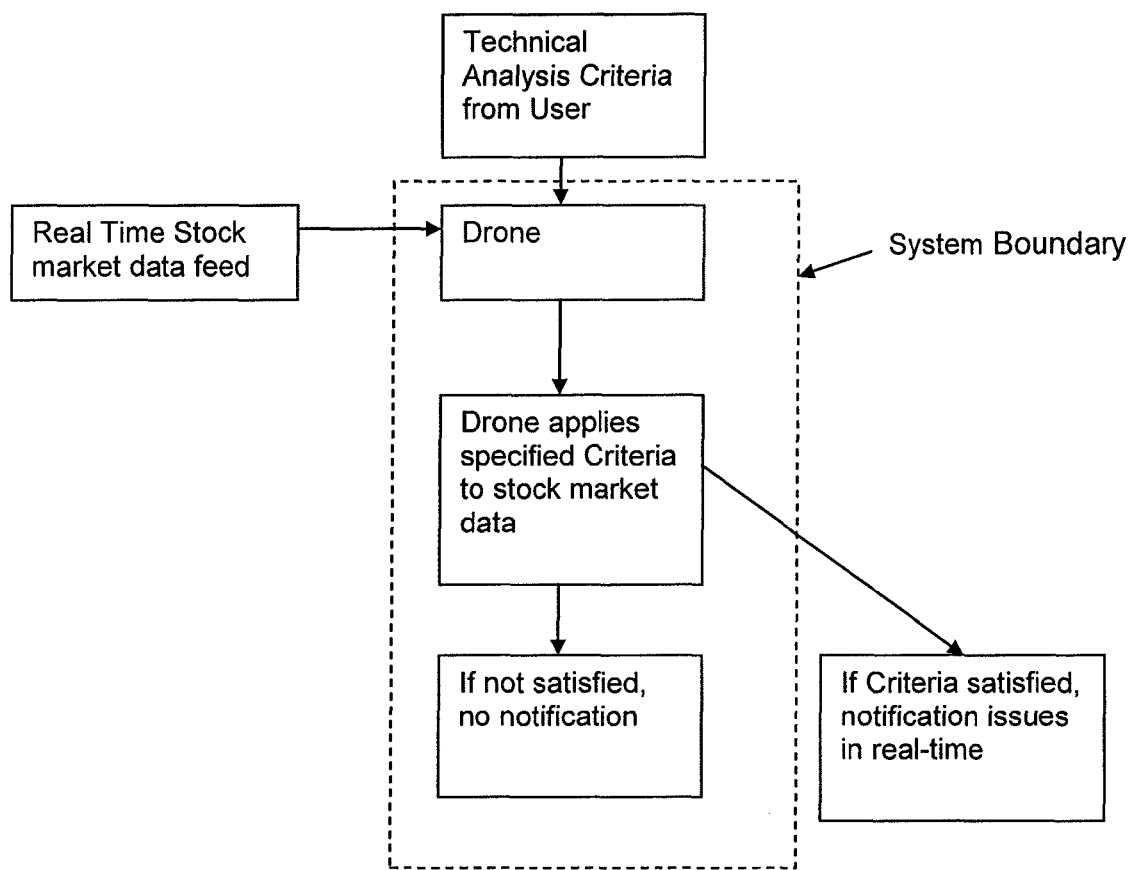
FIG. 3 illustrates an application of the computer system.

With respect to FIG. 2 of the drawings asn internal server infrastructure can comprise the components illustrated and described below:

Gateway: The gateway is one of two parts directly connected to the Internet it allows users and network appliances to connect to their correct server.

Guardian: The guardian keeps track of all major servers on the network. Major servers being single within the given locality. The guardian also has the ability to funnel small amounts of data from load management tools and administrator tools directly to the switchbox for routing and processing.

Alert Manager: The alert manager stores and distribute all created alerts to the least busy drone computer.

Administration tool: The administration tool allows a third party administrator to connect to the system and edit, remove or add users without interrupting the flow of data around the rest of the system.

INS: The INS stores all of the users details, including usernames, passwords and financial data. The INS is a request only server from the major side of the network, and data inside it can only be changed from the administrator tool.

Switch: The switch server(s) are a routing device which routes packets from one server to the other. Any switches main job is keeping the network free from traffic bouncing between many erroneous servers before getting to its destination. Switchboxes are also used to apply "load balancing" to components of the network which are connected to it.

History Client: The history client(s) contain a large database of stock market data which is stored every time a trade is made on the stock market. The history client is a request only client which feeds data from itself to the requesting party, be it an internal server or external device.

Alert Client: The alert client(s) do all of the mathematical calculations for alerts currently running on the system. The alert client(s) request data from the history client(s) and process that data through a series of events. The alert client(s) are responsible for generating the final alert which is sent via the output service.

Output Service: The output service is the network connection software and hardware which connects the network of computers to an output device.

There are two major advantages of the present invention:

(1) Technical Analysis indicators can be applied to a stock (s) or stock market data and boast programming which can inform you of an "indicated" signal to do whatever the indicator was designed to inform the user of, without the user having to ponder over the data themselves.

(2) Technical analysis indicators can be set to "repeat" over a certain period and can be told to alert the user when an "event" happens, via wireless or non wireless technology wherever the user may be.

The features of the system which result in the advantages mentioned above are as follows:

(1) The system is online while an exchange is open. All day, everyday.

(2) The system can more quickly apply thousands of formulas and indicators to stock market data.

(3) The system is more accurate and mathematical in its interpretation of results.

(4) The system can be designed to be "set" and "run". (e.g. the user sets up their indicators and can be alerted of them until it is told to be stopped).

Aspects of the present invention have been described by way of example only and it will be appreciated that modifications and additions thereto may be made without departing from the scope thereof, as defined in the appended claims.

What is claimed is:

1. A method of informing users of stock market events comprising the steps of:
   (a) receiving real-time stock market data on a network of computers;
   (b) receiving on the network of computers instructions from a user to specify watch data defining an event, the watch data including a stock market technical analysis request specifying technical analysis formulae to be applied to the real-time stock market data;
   (c) using the network of computers to periodically apply the user-specified watch data including the stock market technical analysis formulae to the real-time stock market data in real-time to ascertain whether a valid response to the watch data has occurred based on the real-time stock market data, thereby determining an occurrence of the event defined by the user-specified watch data; and
   (d) causing a real-time notification by the network of computers to be provided to the user via a remote communications device upon the occurrence of the event defined by the user-specified watch data, the real-time notification directed to a remote communications device of the user so that the user can then provide instructions for share market transactions on an instantaneous basis.

2. A method as claimed in claim 1, wherein receiving step (b) includes receiving instructions from the user to provide technical analysis criteria for specific stocks, and providing the requested technical analysis criteria for the specific stocks via the remote communications device.

3. A method as claimed in claim 1, wherein receiving step (b) includes receiving instructions from the user to provide technical analysis criteria of overall stock market trends, and providing the requested technical analysis criteria of the overall stock market trends via the remote communications device.

4. A method as claimed in claim 1, wherein the remote communications device comprises a users fixed or mobile telephone, a personal computing device, a facsimile or pager of the user.

* * * * *

UNITED STATES PATENT AND TRADEMARK OFFICE
CERTIFICATE OF CORRECTION

Page 1 of 1

PATENT NO. : 7,941,357 B2
APPLICATION NO. : 10/415022
DATED : May 10, 2011
INVENTOR(S) : Jeffrey Bruce McGeorge It is certified that error appears in the above-identified patent and that said Letters Patent is hereby corrected as shown below:

Title page, insert
--(30)   Foreign Application Priority Data
        October 27, 2000     (AU) ........................ PR 1097--

Signed and Sealed this
Tenth Day of July, 2012

David J. Kappos
*Director of the United States Patent and Trademark Office*

(12) POST-GRANT REVIEW CERTIFICATE (1st)
United States Patent
McGeorge

(10) Number: US 7,941,357 J1
(45) Certificate Issued: Oct. 3, 2014

(54) TRADING SYSTEM

(75) Inventor: Jeffrey Bruce McGeorge, Queensland (AU)

(73) Assignee: Markets-Alert Pty Ltd.

Trial Number:

CBM2013-00005 filed Oct. 15, 2012

Petitioners: Bloomberg Inc.; Bloomberg L.P.; Bloomberg Finance L.P.; The Charles Schwab Corporation; Charles Schwab & Co., Inc.; E*Trade Financial Corporation; E*Trade Securities LLC; E*Trade Clearing LLC; OptionsXpress Holdings Inc.; OptionsXpress, Inc.; TD Ameritrade Holding Corp.; TD Ameritrade, Inc.; TD Ameritrade IP Company, Inc.; ThinkOrSwim Group Inc.

Patent Owner: Markets-Alert Pty Ltd.

Post-Grant Review Certificate for:

Patent No.: 7,941,357
Issued: May 10, 2011
Appl. No.: 10/415,022
PCT Filed: Oct. 26, 2001

The results of CBM2013-00005 are reflected in this post-grant review certificate under 35 U.S.C. 328(b).

POST-GRANT REVIEW CERTIFICATE
U.S. Patent 7,941,357 J1
Trial No. CBM2013-00005
Certificate Issued Oct. 3, 2014

AS A RESULT OF THE POST-GRANT REVIEW PROCEEDING, IT HAS BEEN DETERMINED THAT:

Claims 1-4 are cancelled.

\* \* \* \* \*